(12) United States Patent
Minezawa et al.

(10) Patent No.: US 10,590,889 B2
(45) Date of Patent: Mar. 17, 2020

(54) CANISTER

(71) Applicant: FUTABA INDUSTRIAL CO., LTD., Aichi (JP)

(72) Inventors: Shogo Minezawa, Aichi (JP); Yosuke Kishida, Aichi (JP)

(73) Assignee: FUTABA INDUSTRIAL CO., LTD., Aichi (JP)

( * ) Notice: Subject to any disclaimer, the term of this patent is extended or adjusted under 35 U.S.C. 154(b) by 26 days.

(21) Appl. No.: 15/761,313

(22) PCT Filed: Jun. 8, 2016

(86) PCT No.: PCT/JP2016/067084
§ 371 (c)(1),
(2) Date: Mar. 19, 2018

(87) PCT Pub. No.: WO2017/212580
PCT Pub. Date: Dec. 14, 2017

(65) Prior Publication Data
US 2018/0266363 A1    Sep. 20, 2018

(51) Int. Cl.
*F02M 25/00* (2006.01)
*F02M 25/08* (2006.01)
(Continued)

(52) U.S. Cl.
CPC ..... *F02M 25/0836* (2013.01); *B01D 53/0415* (2013.01); *B60K 15/03504* (2013.01);
(Continued)

(58) Field of Classification Search
CPC ........... F02M 25/0836; F02M 25/0854; F02M 25/08; F02M 33/02; B60K 15/03504;
(Continued)

(56) References Cited

U.S. PATENT DOCUMENTS 7,462,224 B2 * 12/2008 Wolff ................. B01D 53/0407
123/519
9,097,218 B2    8/2015 Yoshida et al.
(Continued)

FOREIGN PATENT DOCUMENTS

JP    2009127603 A    6/2009
JP    2009144684 A    7/2009
(Continued)

OTHER PUBLICATIONS

English translation of the Notification of Reasons for Refusal dated Jul. 31, 2018 from the Japanese Patent Office for corresponding Japanese Patent Application No. 2017-567496.
(Continued)

*Primary Examiner* — Phutthiwat Wongwian
*Assistant Examiner* — Sherman D Manley
(74) *Attorney, Agent, or Firm* — David D. Brush; Westman, Champlin & Koehler, P.A.

(57) ABSTRACT

A canister that is mounted on a vehicle includes an inflow port, an outflow port, an atmosphere port, a valve, at least one honeycomb body, and a spacer. The inflow port is coupled to a fuel tank in the vehicle. The outflow port is coupled to an intake flow passage of an internal combustion engine in the vehicle. The atmosphere port communicates an interior of the canister with an exterior of the canister. The valve opens and closes the atmosphere port. The honeycomb body is arranged in the most downstream side in a gas flow passage that leads to the atmosphere port from the inflow port, which is the upstream of the valve, enables adsorption and desorption of an evaporated fuel evaporated from the fuel tank, and has a honeycomb configuration. The spacer is arranged between the valve and the honeycomb body and maintains a specific distance therebetween.

11 Claims, 3 Drawing Sheets

(51) Int. Cl.
*B60K 15/035* (2006.01)
*B01D 53/04* (2006.01)
B60K 15/03 (2006.01)
F02M 33/02 (2006.01)

(52) U.S. Cl.
CPC ....... *B60K 15/03519* (2013.01); *F02M 25/08* (2013.01); *F02M 25/0854* (2013.01); *B01D 2253/102* (2013.01); *B01D 2257/702* (2013.01); *B01D 2259/4516* (2013.01); *B60K 2015/0348* (2013.01); *B60K 2015/03514* (2013.01); *F02M 33/02* (2013.01)

(58) Field of Classification Search
CPC ...... B60K 15/03519; B60K 2015/0348; B60K 2015/03514; B01D 53/0415; B01D 2253/102; B01D 2259/4516; B01D 2257/702
See application file for complete search history.

(56) References Cited

U.S. PATENT DOCUMENTS

| | | | |
|---|---|---|---|
| 2005/0061301 A1* | 3/2005 | Meiller | F02M 25/0854 123/519 |
| 2005/0172938 A1* | 8/2005 | Uchino | F02M 25/0854 123/519 |
| 2009/0151706 A1* | 6/2009 | Makino | F02M 25/0854 123/519 |
| 2014/0041522 A1* | 2/2014 | Yoshida | F02M 33/02 96/122 |
| 2014/0230796 A1* | 8/2014 | Brock | F02M 25/0854 123/520 |
| 2017/0304766 A1* | 10/2017 | Park | B01D 53/0415 |

FOREIGN PATENT DOCUMENTS

| | | |
|---|---|---|
| JP | 2013130084 A | 7/2013 |
| JP | 2014034909 A | 2/2014 |
| JP | 2015063971 A | 4/2015 |
| JP | 2015086847 A | 5/2015 |

OTHER PUBLICATIONS

English Translation of the Written Opinion of the International Searching Authority dated Aug. 23, 2016 for corresponding International Application No. PCT/JP2016/067084, filed Jun. 8, 2016.
International Search Report dated Aug. 9, 2016 for corresponding International Application No. PCT/JP2016/067084, filed Jun. 8, 2016.
Written Opinion of the International Searching Authority dated Aug. 9, 2016 for corresponding International Application No. PCT/JP2016/067084, filed Jun. 8, 2016.
Machine translation of the Office Action for the corresponding Chinese Patent Application No. 201680052201.3, dated Jul. 12, 2019.

* cited by examiner

CANISTER

CROSS-REFERENCE TO RELATED APPLICATIONS

This Application is a Section 371 National Stage Applications of International Application No. PCT/JP2016/067084, filed Jun. 8, 2016, which is incorporated by reference in its entirety and published as WO 2017/212580 A1 Dec. 14, 2017, not in English.

TECHNICAL FIELD

The present disclosure relates to a canister.

BACKGROUND ART

Patent Document 1 discloses a canister that is mounted on a vehicle. The canister comprises an inflow port that is coupled to a fuel tank in the vehicle, an outflow port that is coupled to an intake flow passage of an internal combustion engine in the vehicle, and an atmosphere port that communicate an interior of the canister with an exterior of the canister. In the canister, air flows into a gas flow passage that leads to the atmosphere port from the inflow port, with the air containing an evaporated fuel that is generated in the fuel tank when the vehicle is not in motion. The evaporated fuel is adsorbed to an adsorbent made of a granulated activated carbon or the like that is arranged inside the gas flow passage. As a result of an intake through the canister during an operation of the internal combustion engine, air that entered from the atmosphere port performs purging of the interior of the canister. Then, the evaporated fuel that is adsorbed to the adsorbent is desorbed from the adsorbent and flows into the intake flow passage of the internal combustion engine through the outflow port.

PRIOR ART DOCUMENTS

Patent Documents

Patent Document 1: Japanese Unexamined Patent Application No. 2009-127603

SUMMARY OF THE INVENTION

Problems to be Solved by the Invention

In such canister, the adsorbent may be a honeycomb body with a honeycomb configuration that can adsorb and desorb the evaporated fuel evaporated from the fuel tank. The honeycomb body generally has an elongated shape and includes through holes along an axis of the honeycomb body. In general, the honeycomb body is arranged in the most downstream side in the aforementioned gas flow passage, which is the upstream of a valve that opens and closes the atmosphere port.

However, during the purging, the canister is likely to create an air turbulence when the air flows through the valve and the air is likely to flow unevenly with respect to an end surface of the honeycomb body. As a result, the throughholes in the honeycomb body are likely to influence and cause variation in respective amounts of the air flowing therein. A through-hole that contains a small amount of air flowing therein insufficiently performs desorption of the evaporated fuel, which results in a decrease in efficiency in desorbing the evaporated fuel that is adsorbed to the honeycomb body.

In one aspect of the present disclosure, it is desirable to provide a canister that is configured such that air flowing through a valve easily flows more evenly with respect to an end surface of a honeycomb body.

Means for Solving the Problems

In one embodiment of the present disclosure, a canister that is mounted on a vehicle comprises an inflow port, an outflow port, an atmosphere port, a valve, at least one honeycomb body, and a spacer. The inflow port is coupled to a fuel tank in the vehicle. The outflow port is coupled to an intake flow passage of an internal combustion engine in the vehicle. The atmosphere port communicates an interior of the canister with an exterior of the canister. The valve opens and closes the atmosphere port. The honeycomb body is arranged in the most downstream side in a gas flow passage that leads to the atmosphere port from the inflow port, which is the upstream of the valve; enables adsorption and desorption of an evaporated fuel evaporated from the fuel tank; and has a honeycomb configuration. The spacer is arranged between the valve and the honeycomb body and maintains a specific distance between the valve and the honeycomb body.

Such a configuration facilitates that air flowing into the canister through the valve disperses evenly during the flow of the air in a space with the specific distance maintained by the spacer between valve and the honeycomb body, thus enabling the air to flow more evenly with respect to an end surface of the honeycomb body.

The canister according to one embodiment of the present disclosure is configured such that the at least one honeycomb body comprises honeycomb bodies that are arranged in a vertically aligned manner, and may further comprise an intermediate filter, which is an elastically deformable filter that is arranged between the neighboring honeycomb bodies. Such a configuration can reduce variation in size between the honeycomb bodies in terms of an entire size of the honeycomb bodies. That is, an individual honeycomb body has a variation in size. In the vertical alignment, the honeycomb bodies may have a further increased variation in size in terms of the entire size of the honeycomb bodies. In contrast, in the aforementioned configuration, the intermediate filter that is arranged between the honeycomb bodies elastically deforms, enabling reduction in the variation in size between the honeycomb bodies in terms of the entire of the honeycombs bodies, and thereby enabling an assembly of the spacer to the gas flow passage without difficulty.

The canister according to one embodiment of the present disclosure further comprises an inner filter, which is a filter that is arranged inside the spacer.

With such a configuration, when the honeycomb body is damaged into pieces, for example, the inner filter can inhibit the damaged pieces to flow into the valve. Furthermore, the inner filter, which is arranged inside the spacer, can prevent the honeycomb body from directly abutting against the inner filter, and thus inhibiting compression of the inner filter.

The canister according to one embodiment of the present embodiment is configured such that the spacer comprises tight-fit portions along a circumferential direction of the spacer that are tightly fitted to an inner wall surface of the gas flow passage.

With such a configuration, it is possible to reduce vibration noise of the spacer. That is, with a configuration that allows the spacer to move toward directions perpendicular to a flow direction in the gas flow passage, vehicle vibration may cause the spacer to vibrate in the directions perpendicular to the flow direction in the gas flow passage and generate the vibration noise. In contrast, with the aforementioned configuration where the spacer comprises the tight-fit portions, the spacer is kept from moving in the directions perpendicular to the flow direction in the gas flow passage. Thus, it is possible to reduce the vibration noise of the spacer.

EXPLANATION OF REFERENCE NUMERALS

1 . . . canister, 10 . . . casing, 11 to 13 . . . cylinder, 14, 15 . . . lid, 17, 18 . . . communicating passage, 21 . . . inflow port, 22 . . . outflow port, 23 . . . atmosphere port, 24 to 28 . . . filter, 51, 52 . . . adsorbent, 60 . . . vent shut valve, 61, 62 . . . honeycomb body, 63 . . . intermediate filter, 64 . . . spacer, 161 to 163 . . . chamber, 651 to 653 . . . abutting portion, 654 to 656 . . . tight-fit portion, 657 . . . inner filter.

MODE FOR CARRYING OUT THE INVENTION

Figure 1:
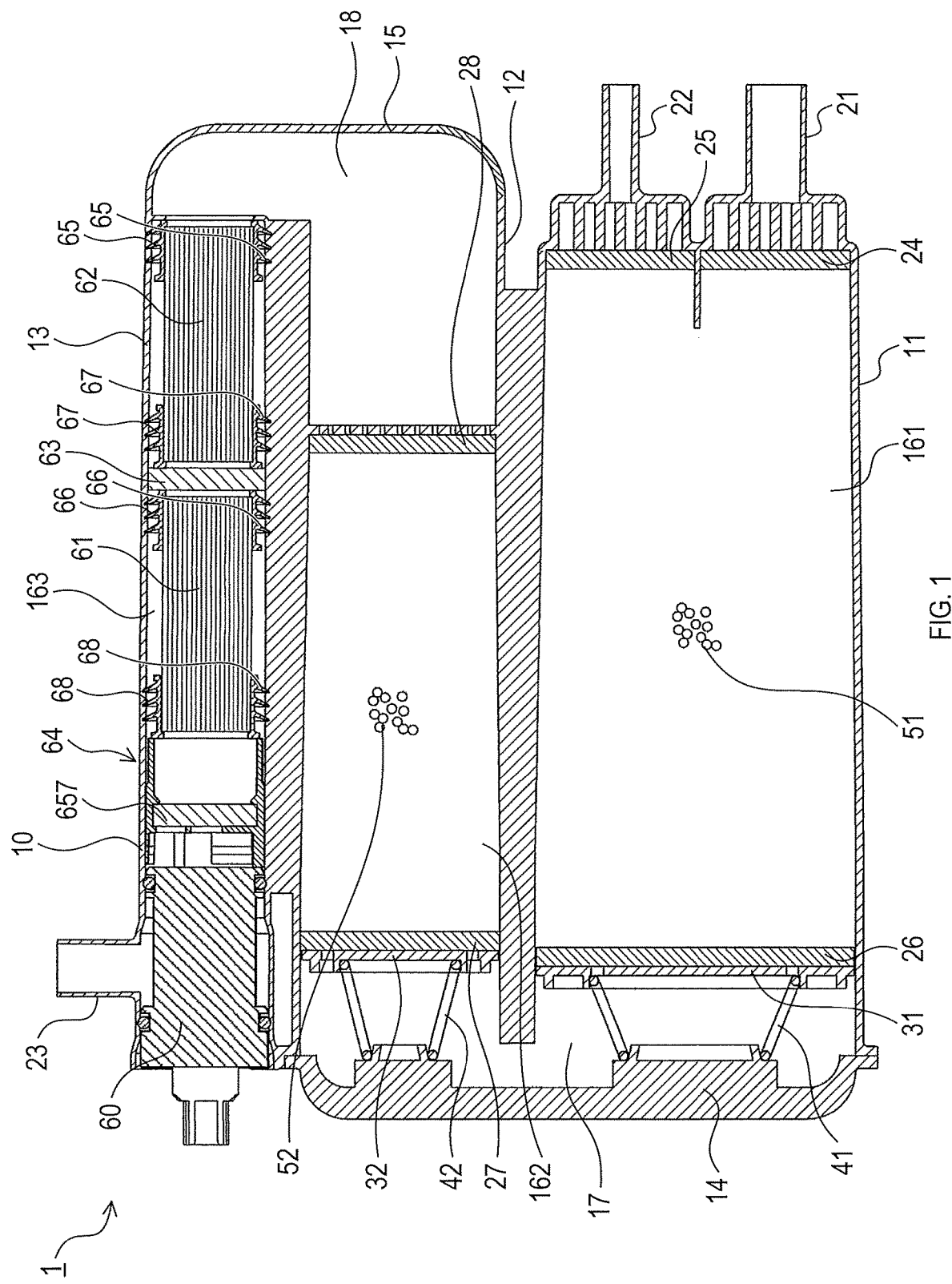
FIG. 1 is a view showing an interior configuration of a canister according to the present embodiment.

Hereinafter, an embodiment for carrying out the present invention will be described with reference to the drawings.
[1. Configuration]
As shown in FIG. 1, a canister 1 of the present embodiment comprises a casing 10 that is made of a synthetic resin. The casing 10 comprises three cylinders, which are a first cylinder 11, a second cylinder 12, and a third cylinder 13. The first cylinder 11, the second cylinder 12, and the third cylinder 13 are arranged in series. The second cylinder 12 is interposed between the first cylinder 11 and the third cylinder 13. The first cylinder 11 has the diameter that is larger than the diameter of the second cylinder 12 and the diameter of the third cylinder 13. The first cylinder 11 and the second cylinder 12 are respectively covered by a lid 14 at one end of the first cylinder 11 and one end of the second cylinder 12 that are located at the same side of the casing 10. The second cylinder 12 and the third cylinder 13 are respectively covered by a lid 15 at the other end of the second cylinder 12 and one end of the third cylinder 13 that are located at the same side of the casing 10, which is opposite to the lid 14.

The casing 10 is configured such that an interior thereof is partitioned into chambers 161 to 163. The first chamber 161 is formed inside the first cylinder 11. The second chamber 162 is formed inside the second cylinder 12. The third chamber 163 is formed inside the third cylinder 13. The first chamber 161 has a greater capacity than respective capacities of the second chamber 162 and the third chamber 163.

The first chamber 161 communicates with the second chamber 162 through a first communicating passage 17. The first communicating passage 17 is a space that is formed inside the casing 10 and comes adjacent to the lid 14 when the lid 14 covers the cylinder 11 and the cylinder 12.

Similarly, the second chamber 162 communicates with third chamber 163 through a second communicating passage 18. The second communicating passage 18 is a space that is formed inside the casing 10 and comes adjacent to a lid 15 when the lid 15 covers second cylinder 12 and the third cylinder 13. In the canister 1 of the present embodiment as configured above, a S-shaped flow passage is formed inside the casing 10 that leads to the second chamber 162 from the first chamber 161 through the first communicating passage 17 and further to the third chamber 163 through the second communicating passage 18.

The first cylinder 11 is closed at the other end thereof that is not covered by the lid 14. On an outer end of a portion that closes the other end of the first cylinder 11, provided are an inflow port 21 and an outflow port 22 that extend parallel to an axis of the first cylinder 11 in an aligned manner along an alignment direction of the cylinders 11 to 13. The inflow port 21 is a port that is coupled to a fuel tank in the vehicle via a check valve. The inflow port 21 introduces air flowing from the fuel tank into the first chamber 161. The air flowing from the fuel tank contains an evaporated fuel. The outflow port 22 is a port that is coupled to an intake flow passage of the internal combustion engine via a purge valve. In the canister 1, purging is performed, which desorbs the evaporated fuel adsorbed to an adsorbent using air that flows into the canister 1 from outside the vehicle due to a vacuum in the internal combustion engine. During the purging, the outflow port 22 introduces air into the intake flow passage that flows through the first chamber 161. The air flowing through the first chamber 161 contains the evaporated fuel that is desorbed from an adsorbent 51 or the like that is described below.

The third cylinder 13 is closed at the other end thereof that is not covered by the lid 15. Provided is an atmosphere port 23 that extends along an axis perpendicular to an axis of the third cylinder 13 on an outer end of an axial wall of the third cylinder 13 that is located in the vicinity of the other end of the third cylinder 13. The atmosphere port 23 is a port that communicates an interior of the canister 1 with an exterior of the canister 1. The atmosphere port 23 releases air flowing through the third chamber 163 to the exterior of the canister 1. The air flowing through the third chamber 163 is free from the evaporated fuel, which results from the evaporated fuel being adsorbed to the adsorbent 51 and or like.

Provided is a filter 24 and a filter 25 at one end of the first chamber 161 in which the inflow port 21 and the outflow port 22 are located. Provided is a filter 26 at the other end of the first chamber 161 in which the lid 14 is located. Provided is a filter 27 at one end of the second chamber 162 in which the lid 14 is located. Provided is a filter 28 at the other end of the second chamber 162 in which the second communicating passage 18 is located. In the present disclosure, the filters 24 to 28 are configured with respective sponges. In contrast, the third chamber 163 has a spacer 64, which is described below.

The filter 26 that is arranged at the lid 14-side of the first cylinder 11 is juxtaposed with a grid 31, which is a porous plate. Between the grid 31 and the lid 14, a coil spring 41 is arranged. The filter 27 that is arranged at the lid 14-side of the second cylinder 12 is juxtaposed with a grid 32, which is the porous plate. Between the grid 32 and the lid 14, a coil spring 42 is arranged. The coil spring 41 and the coil spring 42 respectively press the grid 31 and the grid 32, and thus the adsorbent 51 is held in place in the first chamber 161 and the adsorbent 52 is held in place in the second chamber 162. In the present embodiment, the adsorbent 51 and the adsorbent 52 each is configured with a granular adsorbent that mainly contains activated carbon. The first chamber 161 and the second chamber 162 are respectively filled with the adsorbent 51 and the adsorbent 52.

Provided is a vent shut valve 60 at one end of the third chamber 163 that is not covered by the lid 15. The vent shut valve 60 is configured with an electromagnetic valve such that an operation of the vent shut valve 60 is controlled by an electronic controller, which is not shown in the drawings, and is opened during purging as well as in the following fuel-supply state and non-fuel-supply state. Note that the vent shut valve 60 is opened and closed by the electronic controller when the vehicle is diagnosed whether or not there is a trouble, such as fuel leakage in a fuel system.

The vent shut valve 60 is arranged adjacent to the atmosphere port 23 and has a function to open and close the atmosphere port 23. In FIG. 1, the vent shut valve 60 is illustrated with respect exclusively to an outline thereof, whereas an internal configuration is not illustrated. Note that hatching effect that is given to the vent shut valve 60 in FIG. 1 is not made for the purpose of showing a section of the vent shut valve 60.

In the third chamber 163, two honeycomb bodies 61 and 62 with respective honeycomb configurations are arranged, which enables adsorption and desorption of the evaporated fuel evaporated from the fuel tank. In other word, the honeycomb body 61 and the honeycomb body 62 are arranged in the most downstream side in a gas flow passage (hereinafter, simply referred to as the "gas flow passage") that leads to the atmosphere port 23 from the inflow port 21, which is the upstream of the vent shut valve 60. The honeycomb bodies 61 and 62 each have an elongated shape and includes through-holes along an axis thereof. In the present embodiment, the honeycomb body 61 and the honeycomb body 62 each mainly include activated carbon.

The two honeycomb bodies 61 and 62 are arranged adjacent to and vertically aligned with each other such that the honeycomb body 61 is located in the downstream of the honeycomb body 62 in the gas flow passage. The honeycomb body 62, which is located in the upstream of the honeycomb body 61 in the gas flow passage, is positioned to indirectly abut via rubber 65 against a wall that is located between the third chamber 163 and the second communicating passage 18.

Between the honeycomb body 61 and the honeycomb body 62, an intermediate 63 is arranged so as to fill the gas flow passage. Thus, all the gas flowing between the honeycomb body 61 and the honeycomb body 62 flow pass through the intermediate filter 63. The intermediate filter 63 is elastically deformable and configured with a sponge in the present embodiment. The intermediate filter 63 indirectly abuts against the honeycomb body 61 via a rubber 66 and indirectly abuts against the honeycomb body 62 via a rubber 67.

Between the vent shut valve 60 and the honeycomb body 61, a spacer 64 is arranged. The spacer 64 is a resin-made rigid member to maintain a specific distance between the vent shut valve 60 and the honeycomb body 61. The spacer 64 indirectly abuts against the honeycomb body 61 via a rubber 68. The spacer 64 directly abuts against the vent shut valve 60 without having any members therebetween.

Figure 2:
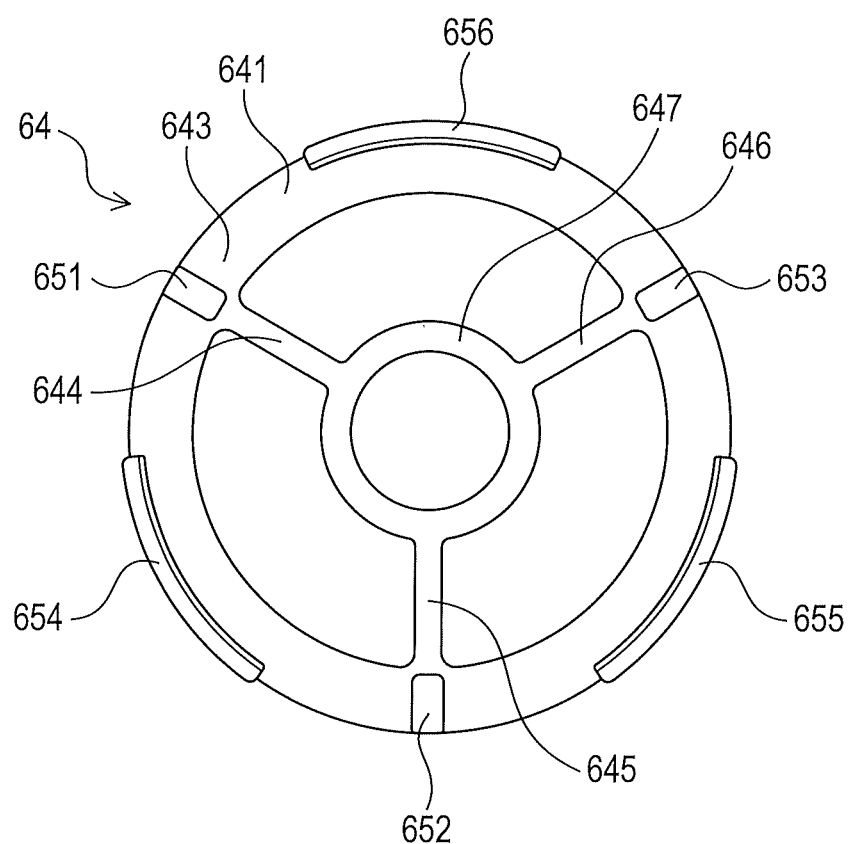
FIG. 2 is a front view of a spacer.
Figure 3:
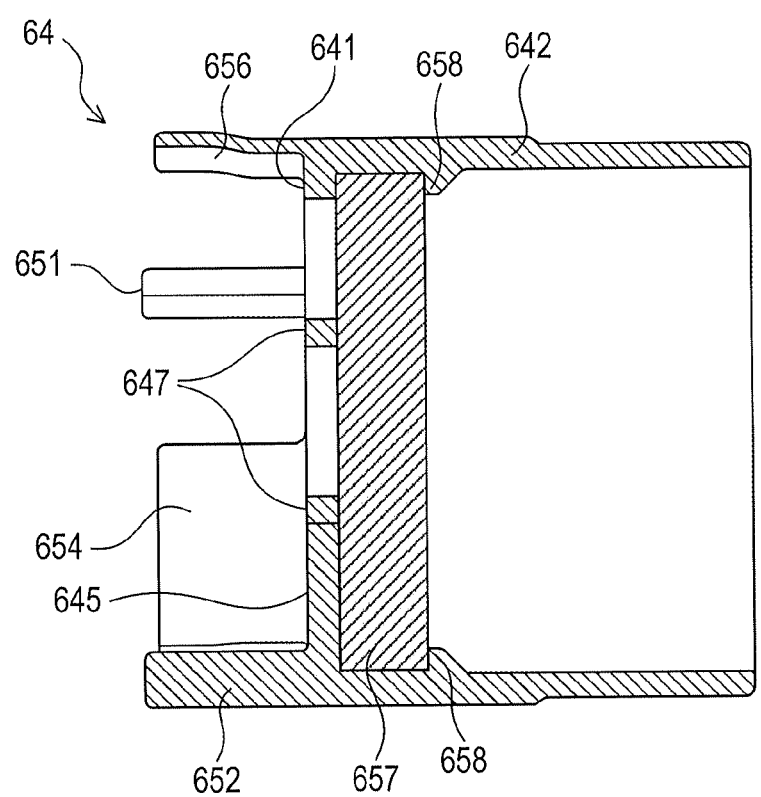
FIG. 3 is a side sectional view of the spacer.

As shown in FIG. 2 and FIG. 3, the spacer 64 comprises a front wall 641 that has a round profile and a cylindrical side wall 642 that is formed continuous with an outer periphery of the front wall 641.

The front wall 641 comprises two ring-shaped portions, which are an outer ring 643; and an inner ring 647. The outer ring 643 has the outer diameter that is larger than the outer diameter of the inner ring 647 and is formed continuous with the side wall 642. The inner ring 647 is coupled to the outer ring 643 via three ribs 644 to 646 and is located inside of the outer ring 643.

The spacer 64 comprises three abutting portions 651 to 653 and three tight-fit portions 654 to 656 that protrude from the outer periphery of the front wall 641 in a first direction of directions along an axis of the side wall 642. The first direction refers to a direction that runs from one end of the spacer 64 on which the front wall 641 is not located to the other end of the spacer 64 on which the front wall 641 is located.

The abutting portions 651 to 653 and the tight-fit portions 654 to 656 are alternately formed along a circumferential direction of the spacer 64. The circumferential direction of the spacer 64 refers to a direction that encloses about a flow direction in the gas flow passage with the spacer 64 being assembled to the canister 1, specifically, to a direction that encloses about the axis of the side wall 642. The tight-fit portions 654 to 656 have respective widths that are greater than respective widths of the abutting portions 651 to 653.

The abutting portions 651 to 653 protrude along the first direction having respective lengths that are longer than respective protruded lengths of the tight-fit portions 654 to 656. The tight-fit portions 654 to 656 each has a shape that flares outward the spacer 64 from the front wall 641.

The spacer 64 is inserted into the gas flow passage from the other end of the third cylinder 13 that is not covered by the lid 15 such that an end of the spacer 64 in which the front wall 641 is formed is located in the downstream side in the gas flow passage. When the spacer 64 is inserted into the gas glow passage, an external force acting on the tight-fit-portions 654 to 656 from the inner wall surface of the gas flow passage causes the tight-fit portions 654 to 656 deform themselves to tilt inward of the spacer 64. Then, with a force that attempts to restore the tight-fit portions 654 to 656 back to respective original shapes, the spacer 64 has a position thereof fixed. In other word, the spacer 64 is pushed in and fixed to the gas flow passage. Thus, respective outer surfaces of the tight-fit portions 654 to 656 are tightly fitted to the inner wall surface of the gas flow passage.

The spacer 64 comprises an inner filter 657 that is arranged inside the spacer 64. The inner filter 657 is configured with a disk-shape sponge and arranged so as to block the gas flow passage. Specifically, a small protrusion 658 is formed along the inner wall surface of the side wall 642 of the spacer 642. The inner filter 657 is arranged between the front wall 641 and the small protrusion 658 such that the inner filter 657 is engaged with the small protrusion 658. When the honeycomb body 61 is damaged into pieces, the inner filter 657 inhibits the damaged pieces from flowing into the vent shut valve 60.

Hereinafter, a description will be given with respect to functions of the canister 1 in a fuel-supply state and in a non-fuel-supply state.

A portion of fuel in the fuel tank is naturally evaporated when the international combustion engine is not in operation and fuel is not supplied (to engine). Then, air that contains the naturally evaporated fuel flows into the canister 1 from the fuel tank. Hereinafter, such a state is referred to as the "non-fuel-supply state."

On the other hand, when the internal combustion engine is not in operation but the fuel is supplied to (the engine), the rapid flow of a supplied fuel causes the air that contains the evaporated fuel to flow rapidly into the canister 1 from the fuel tank. Hereinafter, such a state is referred to as the "fuel-supply state."

In the non-fuel-supply state, the air that contains the evaporated fuel enters into the first chamber 161 from the fuel tank through the inflow port 21. The air containing the evaporated fuel entered into the first chamber 161 passes the filter 24 and flows through a space in the interior of the first chamber 161 that is filled with the adsorbent 51. During the flow of the air containing the evaporated fuel, the adsorbent 51 adsorbs the evaporated fuel.

Air that contains a non-adsorbed evaporated fuel in the first chamber 161 travels through the first communicating passage 17 through the filter 26, and then enters into the second chamber 162 through the filter 27. The air containing the evaporated fuel that entered into the second chamber 162 flows through a space in the interior of the second chamber 162 that is filled with the adsorbent 52. During the flow of the air containing the evaporated fuel, the adsorbent 52 adsorbs the evaporated fuel.

Air that contains a non-adsorbed evaporated fuel in the second chamber 162 travels through the second communicating passage 18 through the filter 28, and then enters into the third chamber 163. The air containing the evaporated fuel that entered into the third chamber 163 passes in the following order through the honeycomb body 62 in the second chamber 162, the intermediate filter 63, and the honeycomb body 61. During the passage of the air containing the evaporated fuel, the honeycomb bodies 61 and 62 adsorb the evaporated fuel.

In the non-fuel-supply state, the vent shut valve 60 is opened. This allows air that is free from the evaporated fuel to pass through the vent shut valve 60 and to be released into the exterior of the canister 1 through the atmosphere port 23.

On the other hand, in the fuel-supply state, the air that contains the evaporated fuel enters into the first chamber 161 from the fuel tank through the inflow port 21. Then, as in the case of the non-fuel-supply state, the air entered into the first chamber 161 reaches all the way into the third chamber 163. During this, the adsorbents 51 and 52, and the honeycomb bodies 61 and 62 adsorb the evaporated fuel contained in the air that enters into the canister 1. In the fuel-supply state, the vent shut valve 60 is opened by the electronic controller. This allows the air that is free from the evaporated fuel to pass through the vent shut valve 60 and to be released into the exterior of the canister 1 through the atmosphere port 23.

A description will be given with respect to the functions of the canister 1 during the operation of the internal combustion engine, so-called purging.

During the operation of the internal combustion engine, the vent shut valve 60 is opened by the electronic controller. The vacuum in the internal combustion engine causes air in the exterior of the canister 1 to enter into the third chamber 163 from the atmospheric port 23. The air entered into the third chamber 163 passes the intermediate filter 63 after desorption of the fuel from the honeycomb body 61 and thereafter desorbs the fuel from the honeycomb body 62. Then, the air that contains the desorbed fuel travels through the second communicating passage 18 and enters into the second chamber 162 through the filter 28.

Furthermore, the air containing the fuel that entered into the second chamber 162 desorbs the fuel from the adsorbent 52 in the second chamber 162. The air containing the fuel that flows from the second chamber 162 passes in the following order through the filter 27, the first communicating passage 17, and filter 26 and then enters into the first chamber 161. Similarly, the fuel is desorbed from the adsorbent 51 in the first chamber 161. Then, the air containing the fuel flows into the intake flow passage of the internal combustion engine through the outflow port 22 and the purge valve.

[2. Effect]

According to the above-detailed embodiment, the following effects can be obtained.

(1) In the present embodiment, the spacer 64 is arranged between the vent shut valve 60 and the honeycomb body 61 so as to maintain the specific distance therebetween. This facilitates that the air flowing into the canister 1 through the vent shut valve 60 evenly disperses during the flow of the air through a space having the specific distance maintained by the spacer 64 between the vent shut valve 60 and the honeycomb body 61, thus enabling the air to evenly flow with respect to an end surface of the honeycomb body 61. Consequently, it is possible to reduce that through-holes in the honeycomb body 61 and also in the following honeycomb body 62 influence and cause variation in respective amounts of the air flowing therein. Thus, it is possible to reduce a decrease in efficiency in desorbing the evaporated fuel that is adsorbed to the honeycomb bodies 61 and 62.

(2) In the present embodiment, the two honeycomb bodies 61 and 62 are arranged in a vertically aligned manner. Provided is the elastically deformable intermediate filter 63 between the neighboring honeycomb bodies 61 and 62. Accordingly, it is possible to reduce variation in size between the honeycomb body 61 and the honeycomb body 62 in terms of an entire size of these two members. In other word, it is possible to reduce variation in length between the honeycomb body 61 and the honeycomb body 62 in terms of an entire length (from an end surface of the honeycomb body 62 that is located in the upstream in the gas flow passage to an end surface of the honeycomb body 61 that is located in the downstream in the gas flow passage).

That is, the honeycomb body 61 and the honeycomb body 62 have variation in size. In a vertical alignment, the honeycomb body 61 and the honeycomb body 62 may have a further increased variation in size in terms of the entire size of these two members. In contrast, in the present embodiment, the intermediate filter 63 that is arranged between the two honeycomb bodies 61 and 62 elastically deforms, enabling reduction in the variation in size between the honeycomb body 61 and the honeycomb body 62 in terms of the entire size thereof, and thereby enabling an assembly of the spacer 64 to the gas flow passage without difficulty.

(3) In the present embodiment, the inner filter 657 is arranged inside the spacer 64. Accordingly, when the honeycomb body 61 is damaged into pieces, the inner filter 657 inhibits the damaged pieces to flow into the vent shut valve 60. Furthermore, the inner filter 657, which is arranged inside the space 64, prevents the honeycomb body 61 from directly abutting against the inner filter 657, and thus inhibiting compression of the inner filter 657.

(4) In the present embodiment, the spacer 64 comprises the tight-fit portions 654 to 656 along the circumferential direction of the spacer 64 that are tightly fitted to the inner wall surface of the gas flow passage. This restricts that the spacer 64 moves in directions perpendicular to a flow direction in the gas flow passage. Specifically, the spacer 64 is restricted to move along a diametric axis of the gas flow passage. Thus, it is possible to reduce a vibration noise that is generated as a result of the spacer 64 vibrating in the directions perpendicular to the flow direction in the gas flow passage.

[3. Other Embodiments]

Accordingly, while the embodiment for carrying out the present disclosure has been described, the present disclosure is not limited to the above-described embodiment and can be implemented in various modifications.

(1) In the aforementioned embodiment, the canister 1 comprises the two honeycomb bodies 61 and 62. However, the number of the honeycomb body is not limited hereto. The honeycomb body may be one honeycomb body, or three or more honeycomb bodies.

(2) In the aforementioned embodiment, the canister 1 comprises the intermediate filter 63 and the inner filter 657. However, presence of the intermediate filter and the inner filter is not limited hereto. At least one of the intermediate filter and the inner filter may not be provided to the canister.

(3) In the aforementioned embodiment, the spacer 64 indirectly abuts against the honeycomb body 61 via the rubber 68 and directly abuts against the vent shut valve 60 without having any members therebetween. However, an abutment between the spacer and the honeycomb body, and between the spacer and the vent shut valve is not limited hereto. For example, the spacer may directly abut against the honeycomb body without having any members therebetween and indirectly abut against the vent shut valve via a rubber or the like.

Similarly, in the aforementioned embodiment, the intermediate filter 63 respectively indirectly abuts against the honeycomb body 61 and the honeycomb body 62 via the rubber 66 and the rubber 67. However, the abutments of the intermediate filter 63 against respective honeycomb bodies are not limited hereto. For example, the intermediate filter may directly abut against at least one of the two honeycomb bodies without having any members therebetween.

(4) In the aforementioned embodiment, the filters 24 to 28, the intermediate filter 63, and the inner filter 657 each is configured with a sponge material. However, respective materials of the filters, the intermediate filter, and the inner filter are not limited hereto. For example, the filters, the intermediate filter, and the inner filter may be configured with nonwoven fabric or the like.

(5) In the aforementioned embodiment, the canister 1 is configured to comprise the three cylinders 11 to 13 and forms the S-shaped flow passage in the canister 1. However, a configuration of the canister is not limited hereto. For example, the canister may comprise two cylinders and form an U-shaped flow passage in the canister.

(6) Functions of one element of the aforementioned embodiment may be performed by elements. One function of one element may be performed by elements. Functions of elements may be performed by one element. One function of elements may be performed by one element. Part of the configurations of the above-described embodiments may be omitted. At least one of the configurations of the above-described embodiments may be added to or replaced with the configurations of the other above-described embodiments. Any embodiment included in the technical ideas defined by the language of the claims is an embodiment of the present disclosure.

The invention claimed is:

1. A canister configured for mounting on a vehicle, the canister comprising:
   an inflow port configured for coupling to a fuel tank in the vehicle,
   an outflow port configured for coupling to an intake flow passage of an internal combustion engine in the vehicle,
   an atmosphere port that communicates an interior of the canister with an exterior of the canister,
   a valve that opens and closes the atmosphere port,
   at least one honeycomb body arranged in a most downstream side in a gas flow passage that leads to the atmosphere port from the inflow port, which is upstream of the valve, wherein the at least one honeycomb body is configured to enable adsorption and desorption of an evaporated fuel evaporated from the fuel tank, and has a honeycomb configuration, and wherein the at least one honeycomb body comprises at least two honeycomb bodies arranged in a vertically aligned manner,
   a spacer arranged between the valve and the at least one honeycomb body and configured to maintain a specific distance between the valve and the at least one honeycomb body, and
   an intermediate filter, which is an elastically deformable filter arranged between the at least two honeycomb bodies.

2. The canister according to claim 1, wherein the canister further comprises an inner filter, which is a filter that is arranged inside the spacer.

3. The canister according to claim 2, wherein the spacer comprises tight-fit portions along a circumferential direction of the spacer that are tightly fitted to an inner wall surface of the gas flow passage.

4. The canister according to claim 1, wherein the spacer comprises tight-fit portions along a circumferential direction of the spacer that are tightly fitted to an inner wall surface of the gas flow passage.

5. The canister according to claim 1,
   wherein the spacer includes three tight-fit portions located on a valve side of the spacer and configured to contact an interior wall of a cylinder such that the spacer is held coaxially in the cylinder, and
   wherein the three tight-fit portions are spaced equidistantly about a circumference of the spacer.

6. The canister according to claim 5, wherein the spacer further includes three abutting portions located on the valve side of the spacer, extending towards the valve, configured to abut the valve, and configured to prevent the tight-fit portions from abutting the valve.

7. The canister according to claim 6, wherein the spacer further includes:
   an outer ring supporting the three tight-fit portions and the three abutting portions,
   an inner ring located coaxially with the outer ring, and
   three ribs extending from the inner ring to the outer ring.

8. The canister according to claim 7,
   wherein the three tight-fit portions include:
      a first tight-fit portion,
      a second tight-fit portion, and
      a third tight fit portion,
   wherein the three abutting portions include:
      a first abutting portion,
      a second abutting portion, and
      a third abutting portion,
   wherein the three ribs include:
      a first rib,
      a second rib, and
      a third rib, and
   wherein the three ribs are spaced equidistantly about the inner ring.

9. The canister according to claim 8,
   wherein the first abutting portion is aligned with the first rib,
   wherein the second abutting portion is aligned with the second rib, and wherein the third abutting portion is aligned with the third rib.

10. The canister according to claim 9,
wherein the first tight-fit portion is located between the first abutting portion and the second abutting portion,
wherein the second tight-fit portion is located between the second abutting portion and the third abutting portion, and
wherein the third tight-fit portion is located between the third abutting portion and the first abutting portion.

11. The canister according to claim 10,
wherein the spacer further includes:
   a cylindrical side wall extending away from the valve, and
   a small protrusion protruding inwardly from the cylindrical side wall, and configured to retain an inner filter against the three ribs.

* * * * *